UNITED STATES PATENT OFFICE 2,277,823

PREPARATION OF GUANYL UREA

George H. Foster, Stamford, and David W. Jayne, Jr., Old Greenwich, Conn., assignors to American Cyanamid Company, New York, N. Y., a corporation of Maine No Drawing. Application December 13, 1939, Serial No. 308,981

1 Claim. (Cl. 260—553)

The present invention relates to methods of preparing guanyl urea.

The principal object of the invention is to prepare the above substance in a state of purity by a simple procedure.

The invention contemplates the production of guanyl urea by reacting a solution of guanyl urea sulfate with lime so as to precipitate calcium sulfate and liberate guanyl urea base which may then be recovered from its aqueous solution through crystallization by cooling rather than by evaporation as the latter has a tendency to thermally decompose the product.

The invention further contemplates a complete process for the production of guanyl urea by hydrolyzing dicyandiamid in the presence of aqueous sulfuric acid followed by precipitation of the calcium from the resultant guanyl urea sulfate. The guanyl urea base may then be recovered as above.

The above complete method is particularly desirable in that no complicated steps are involved and the final product is obtainable in a high stage of purity in very good yields.

Example 1

400 pounds of guanyl urea sulfate dihydrate are slurried in about 600 pounds of water and warmed to approximately 50° C. to completely dissolve the salt. Heating is then discontinued and the addition of 90 pounds of hydrated lime started. The solution is agitated vigorously during the lime addition while at the same time it is cooled so that the temperature is brought down to about 20° C. by the time all of the lime has been added. Addition of lime is stopped when a test of a filtered sample of the resultant slurry with calcium chloride shows the absence of sulfate. The batch is then filtered, the cake washed and the calcium sulfate on the filter discarded. The filtrate is an aqueous solution of guanyl urea containing about 20% of the free base. In this form, it may be utilized for various purposes including the preparation of the guanidine salts.

The wash water from the filter cake containing appreciable quantities of the free base may then have sulfuric acid added thereto sufficient to neutralize the base and convert it to the more heat stable sulfate and for return to the process in making up the mixed batch.

It is to be noted that in order to obtain a relatively concentrated guanyl urea base solution and at the same time avoiding thermal decomposition thereof, the reaction mix is cooled below 50° C. during the addition of the lime. This is important if high yields are to be obtained.

Example 2

400 pounds of water, 250 pounds of 50% sulfuric acid and 180 pounds of dicyandiamid are reacted together, the acid being added gradually, the rate being regulated by the degree of boiling produced. The reaction mixture containing guanyl urea sulfate is then cooled to below 50° C. The addition of 120 pounds of lime is then started while maintaining the temperature of the magma at not over 50° C. and preferably between 20 and 50° C. When a test with calcium chloride solution shows the absence of sulfate from the filtrate of a filtered sample, the entire batch is filtered and the cake washed with water.

The wash water from the filter cake is added to the filtrate until the specific gravity of the washing has fallen to approximately 1.06 and the remainder, about 400 pounds, is utilized in making up the dicyandiamid solution for the following batch. The wash water containing guanyl urea base not being heat-stable is, therefore, preferably neutralized with sulfuric acid to convert the base to the more stable sulfate.

If the wash water is not to be returned to the start of another cycle, it may be combined with the filtrate where, for instance, the guanyl urea base is to be used for conversion to guanyl urea carbonate or other compounds.

This application is a continuation in part of applicant's co-pending application Serial No. 257,096.

We claim:

A method of making guanyl urea which comprises hydrolyzing dicyandiamid in the presence of water and sulfuric acid in substantially the proportions of 180 pounds of dicyandiamid to 400 pounds of water and 240 pounds of 50% sulfuric acid, cooling the reaction mixture to approximately 50° C., adding lime thereto until a test on a filtered portion of the batch shows the absence of sulfate, filtering off the calcium sulfate, washing the filter cake until the specific gravity of the washings is approximately 1.06, neutralizing the guanyl urea base in the wash water with sulfuric acid, and returning the resultant solution of guanyl urea sulfate to the start of the cycle.

GEORGE H. FOSTER.
DAVID W. JAYNE, JR.